(12) United States Patent
Duan

(10) Patent No.: US 6,544,137 B2
(45) Date of Patent: Apr. 8, 2003

(54) DIFFERENTIAL DEVICE

(75) Inventor: Xiaohong Nina Duan, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/908,346

(22) Filed: Jul. 18, 2001

(65) Prior Publication Data

US 2003/0017903 A1 Jan. 23, 2003

(51) Int. Cl.[7] .............................................. F16H 48/26
(52) U.S. Cl. ......................................................... 475/89
(58) Field of Search ............................................ 475/89

(56) References Cited

U.S. PATENT DOCUMENTS

| | | | |
|---|---|---|---|
| 473,444 A | 4/1892 | Barney | |
| 1,677,996 A | 7/1928 | Wingquist | |
| 2,175,520 A | 10/1939 | Frederickson | |
| 2,623,619 A | 12/1952 | Clerk | |
| 2,986,024 A | 5/1961 | Power | |
| 3,118,292 A | 1/1964 | Schroter et al. | |
| 3,350,961 A | 11/1967 | Dodge | |
| 3,724,289 A | 4/1973 | Kennicutt | |
| 3,831,461 A | * 8/1974 | Mueller | |
| 4,012,968 A | 3/1977 | Kelbel | |
| 4,462,272 A | 7/1984 | Roper | |
| 4,493,227 A | * 1/1985 | Schmid | |
| 4,633,735 A | 1/1987 | Sakurai et al. | |
| 4,676,336 A | 1/1987 | Hiramatsu et al. | |
| 4,719,817 A | 1/1988 | Azuma | |
| 4,730,514 A | 3/1988 | Shikata et al. | |
| 4,779,698 A | 10/1988 | Iwata | |
| 4,838,118 A | 6/1989 | Binkley | |
| 4,841,809 A | 6/1989 | Jolly | |
| 4,867,012 A | 9/1989 | McGarraugh | |
| 4,884,653 A | 12/1989 | Kouno | |
| 4,905,808 A | 3/1990 | Tomita et al. | |
| 4,949,594 A | 8/1990 | Galhotra | |
| 4,960,011 A | 10/1990 | Asano | |
| 4,966,268 A | 10/1990 | Asano et al. | |

(List continued on next page.)

FOREIGN PATENT DOCUMENTS

| | | |
|---|---|---|
| EP | 0911204 | 4/1999 |
| GB | 2 187 824 | 3/1986 |
| GB | 2252801 | 2/1992 |
| JP | 01182127 A | 7/1989 |
| JP | 1261553 | 10/1989 |
| JP | 200062495 | 2/2000 |
| JP | 200074096 | 3/2000 |
| JP | 2001-163079 | 6/2001 |

OTHER PUBLICATIONS

M. Okcuoglu, "*A Descriptive Analysis of Gerodisc Type Limited Slip Differentials and All Wheel Drive Couplings*", Society of Automotive Engineers, Inc., Copyright 1995, pp. 15–20.

*Primary Examiner*—Dirk Wright
(74) *Attorney, Agent, or Firm*—Brinks Hofer Gilson & Lione

(57) ABSTRACT

A differential device for coupling an input shaft, a first output shaft, and a second output shaft is provided. The differential device preferably includes a differential case with a first side gear, a second side gear, a pinion gear, and a hydraulic conduit. The differential device preferably includes a first rotary pump, which preferably functions to pump hydraulic fluid through the hydraulic conduit upon the relative rotational movement of the differential case and the first output shaft and to resist relative rotational movement of the differential case and the first output shaft upon a restriction of the transmittal of hydraulic fluid through the hydraulic conduit. The differential device also preferably includes a valve system, which functions to selectively restrict the transmittal of hydraulic fluid through the hydraulic conduit.

13 Claims, 3 Drawing Sheets

U.S. PATENT DOCUMENTS

| | | | |
|---|---|---|---|
| 4,974,471 A | 12/1990 | McGarraugh | |
| 4,987,967 A | 1/1991 | Kouno | |
| 4,995,491 A | 2/1991 | Hiramatsu et al. | |
| 5,007,886 A | 4/1991 | Holmquist et al. | |
| RE33,742 E | 11/1991 | Blessing et al. | |
| 5,092,825 A | 3/1992 | Goscenski, Jr. et al. | |
| 5,172,787 A | 12/1992 | Kobayashi | |
| RE34,209 E * | 3/1993 | McGarraugh | 475/89 |
| 5,194,053 A * | 3/1993 | Sano et al. | 475/89 |
| 5,201,820 A | 4/1993 | Hamada et al. | |
| 5,415,598 A | 5/1995 | Sawase et al. | |
| 5,445,574 A | 8/1995 | Sekiguchi et al. | |
| 5,456,641 A | 10/1995 | Sawase | |
| 5,469,950 A | 11/1995 | Lundström et al. | |
| 5,536,215 A | 7/1996 | Shaffer et al. | |
| 5,542,316 A | 8/1996 | Spooner et al. | |
| 5,690,002 A | 11/1997 | Showalter | |
| 5,735,764 A | 4/1998 | Shaffer et al. | |
| 5,827,145 A | 10/1998 | Okcuoglu | |
| 5,888,163 A | 3/1999 | Shaffer et al. | |
| 5,893,812 A | 4/1999 | Narai et al. | |
| 5,915,513 A | 6/1999 | Isley, Jr. et al. | |
| 5,916,052 A | 6/1999 | Dick | |
| 5,938,555 A | 8/1999 | Leeper | |
| 5,938,556 A | 8/1999 | Lowell | |
| 5,941,788 A * | 8/1999 | Shaffer et al. | 475/88 |
| 5,964,126 A | 10/1999 | Okcuoglu | |
| 5,979,631 A | 11/1999 | Lundstrom | |
| 5,984,822 A | 11/1999 | Schreier et al. | |
| 6,001,040 A | 12/1999 | Engle | |
| 6,019,694 A | 2/2000 | Forrest et al. | |
| 6,048,286 A | 4/2000 | Perry | |
| 6,095,939 A | 8/2000 | Burns et al. | |
| 6,119,061 A | 9/2000 | Schenkel et al. | |
| 6,176,800 B1 | 1/2001 | Shaffer et al. | |
| 6,213,241 B1 | 4/2001 | Kita et al. | |
| 6,332,522 B1 | 12/2001 | Morse et al. | |

* cited by examiner

DIFFERENTIAL DEVICE

TECHNICAL FIELD OF THE INVENTION

This invention relates generally to differential devices in the automotive industry and, more specifically, to limited slip differential devices for coupling an input shaft, a first output shaft, and a second output shaft.

BACKGROUND OF THE INVENTION

In front or rear wheel drive vehicles, a front or rear differential is typically used to transfer the torque and motion from the engine and transmission to the left and right half shafts, and to allow the two half shafts to rotate at different speeds, which is fundamental to the vehicle for efficient turns. For all-wheel-drive vehicles, a central differential is typically installed to allow the front and rear shafts to rotate at different speeds, which, again, is fundamental to the vehicle for efficient turns and for stress avoidance. In a vehicle using a conventional differential, however, if one wheel loses traction, the other wheel loses traction also. The limited slip differential was created to overcome this problem. In a vehicle using a conventional limited slip differential, if one wheel lost traction and begun to rotate much faster than the other wheel, the conventional limited slip differential sensed the situation and restricted the rotation of the wheel. Because increased traction is very important in a vehicle, especially in off-road conditions, there is a need in the automotive industry for continuous improvement of the limited slip differential.

DETAILED DESCRIPTION OF THE PREFERRED EMBODIMENTS

The following description of two preferred embodiments of the invention is not intended to limit the scope of the invention to these preferred embodiments, but rather to enable any person skilled in the art of automotive differential devices to make and use the invention.

Figure 1:
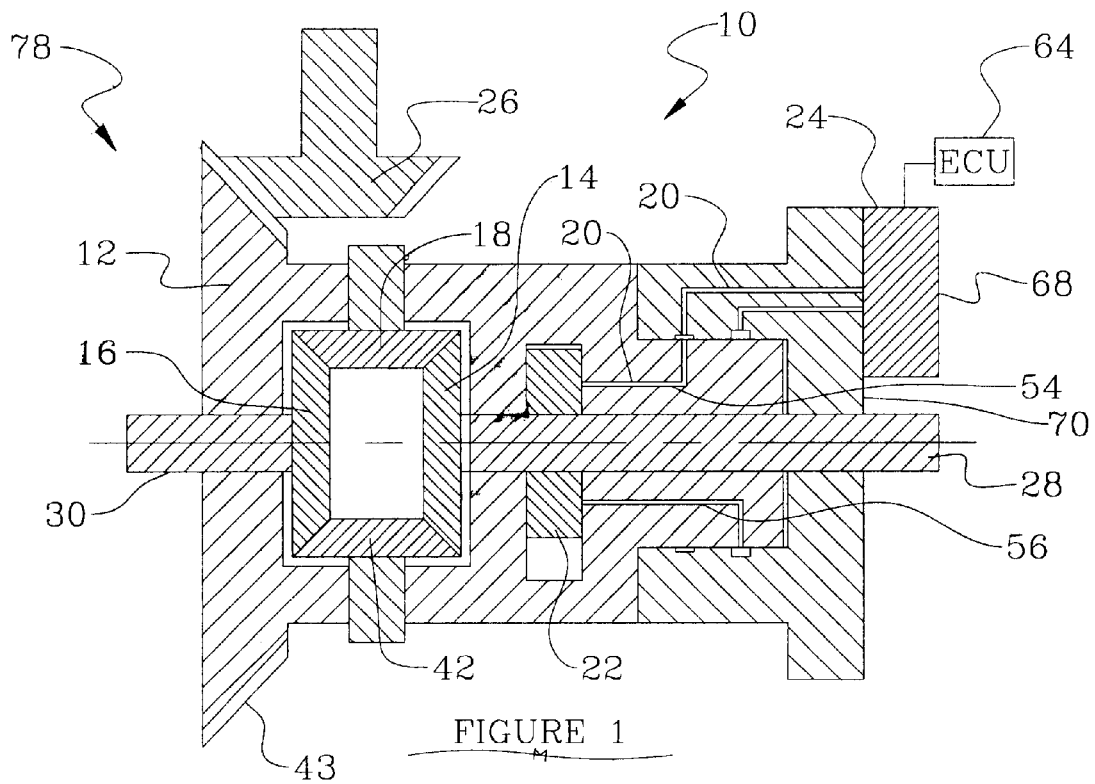
FIG. 1 is cross-sectional view of the device of the first preferred embodiment.

As shown in FIG. 1, the limited slip differential device 10 of the first preferred embodiment includes a differential case 12, a first side gear 14, a second side gear 16, a first pinion gear 18, an hydraulic conduit 20, a first rotary pump 22, and a valve system 24. The differential case 12 is preferably coupled to an input shaft 26, while the first side gear 14 and the second side gear 16, which are preferably located within the differential case 12, are preferably coupled to a first output shaft 28 and a second output shaft 30, respectively. The first pinion gear 18, which is also preferably located within the differential case 12, is preferably coupled to the first side gear 14 and the second side gear 16. The hydraulic conduit 20 is preferably coupled to the differential case 12. The first rotary pump 22 is preferably coupled to the differential case 12 and the first output shaft 28. Finally, the valve system 24 is preferably coupled to the hydraulic conduit 20.

Figure 2:
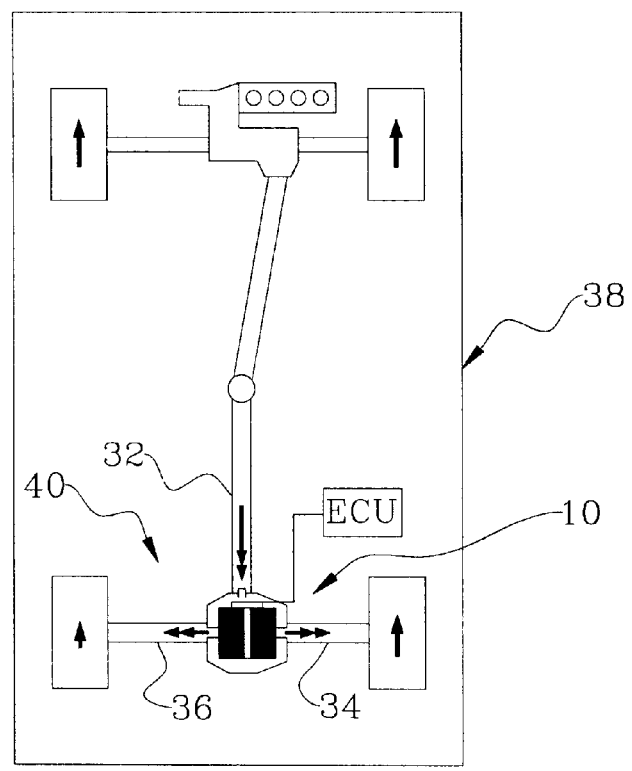
FIG. 2 is a schematic of the device of FIG. 1 arranged within a front-wheel-drive based vehicle with all-wheel-drive capabilities.

As shown in FIG. 2, the limited slip differential device 10 of the first preferred embodiment has been specifically designed for coupling a drive shaft 32, a right half shaft 34, and a left half shaft 36 of a front-wheel-drive based vehicle 38 with all-wheel-drive capabilities. In this arrangement, the limited slip differential device 10 of the first preferred embodiment is known as a rear axle limited slip differential 40. The limited slip differential device 10, however, may be used in other suitable arrangements. As an example, the device may be used for coupling a front drive shaft and a rear drive shaft of a front-wheel-drive based vehicle with all-wheel-drive capabilities (known as a central limited slip differential device) or the device may be used for coupling a transmission output and a rear drive shaft of a rear-wheel-drive based vehicle.

As shown in FIG. 1, the limited slip differential device 10 of the first preferred embodiment also includes a second pinion gear 42, which is preferably located within the differential case 12 and is preferably coupled to the first output shaft 28 and the second output shaft 30. The first side gear 14, the second side gear 16, the first pinion gear 18, and the second pinion gear 42 preferably cooperate to transfer relative rotational movement of the differential case 12 and one of the output shafts 28 and 30 into relative rotational movement of the differential case 12 and the other of the output shafts 28 and 30. In this manner, the differential case 12, the first side gear 14, the second side gear 16, the first pinion gear 18, and the second pinion gear 42 preferably act as a conventional differential system. In alternative embodiments, the limited slip differential device 10 may include other suitable devices to transfer relative rotational movement of the differential case 12 and one of the output shafts 28 and 30 into relative rotational movement of the differential case 12 and the other of the output shafts 28 and 30.

The differential case 12 of the first preferred embodiment also includes a ring gear 43. The ring gear 43 preferably functions to transfer rotational movement of the input shaft 26 into rotational movement of the differential case 12 about a perpendicular axis. The differential case 12, including the first side gear 14, the second side gear 16, the first pinion gear 18, the second pinion gear 42, and the ring gear 43, is preferably made with conventional structural materials, such as steel, and from conventional methods, but may alternatively be made with other suitable materials and from other suitable methods.

Figure 3:
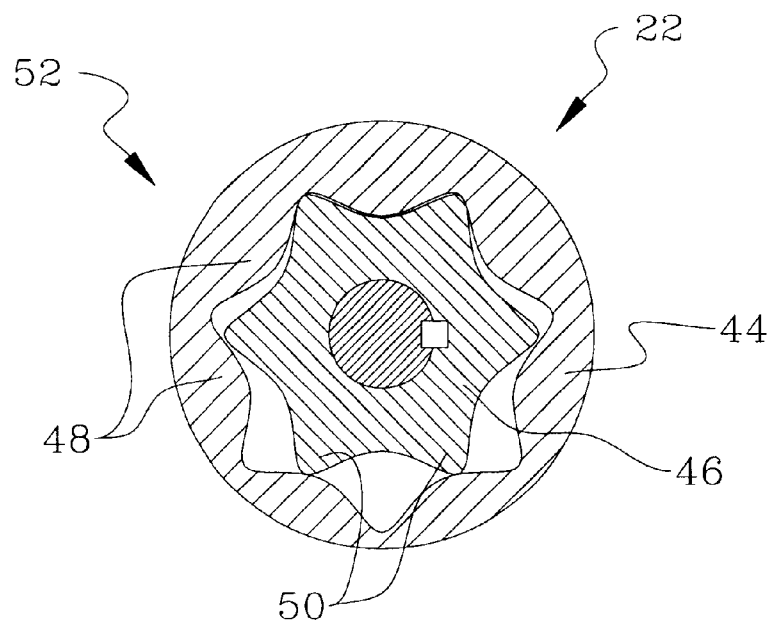
FIG. 3 is a cross-sectional view of the first rotary pump of the device of FIG. 1.

As shown in FIG. 3, the first rotary pump 22 of the first preferred embodiment includes an exterior element 44 coupled to the differential case and an interior element 46 coupled to the first output shaft. The first rotary pump 22 preferably functions to pump a hydraulic fluid (not shown) through the hydraulic conduit upon relative rotational movement of the differential case and the first output shaft. The first rotary pump 22 also preferably functions to resist relative rotational movement of the differential case and the first output shaft upon a restriction of the transmittal of hydraulic fluid through the hydraulic conduit. The exterior element 44 preferably has inward teeth 48, while the interior element 46 preferably has outward teeth 50. In the preferred embodiment, the exterior element 44 preferably has seven inward teeth 48, while the interior element 46 preferably has six outward teeth 50. In alternative embodiments, however, the exterior element 44 may have more or less than seven inward teeth 48, and the interior element 46 may have more or less the six outward teeth 50, as long as the exterior element 44 has more inward teeth 48 than the interior element 46 has outward teeth 50. The inward teeth 48 of the exterior element 44 are preferably shifted relative the rotational axis of the exterior element 44. With this tooth arrangement, the first rotary pump 22 is commonly known as a gerotor pump 52. The first rotary pump 22, however, may include other suitable elements that, either in combination with the above elements or as substitution of the above elements, function to pump the hydraulic fluid upon relative rotational movement of the differential case and the first output shaft and to resist relative rotational movement of the differential case and the first output shaft upon a restriction of the transmittal of hydraulic fluid through the hydraulic conduit. The first rotary pump 22, including the exterior element 44 and the interior element 46, is preferably made with conventional materials and from conventional methods, but may alternatively be made with other suitable materials and from other suitable methods.

As shown in FIG. 1, the differential case 12 of the first preferred embodiment defines a first portion 54 and a second portion 56 of the hydraulic conduit 20. Both the first portion 54 and the second portion 56 of the hydraulic conduit 20 preferably function to transmit hydraulic fluid to and from the first rotary pump 22. In alternative embodiments, other suitable devices may define the first portion 54 and the second portion 56 of the hydraulic conduit 20 and other suitable devices may transmit hydraulic fluid to and from the first rotary pump 22.

Figure 4:
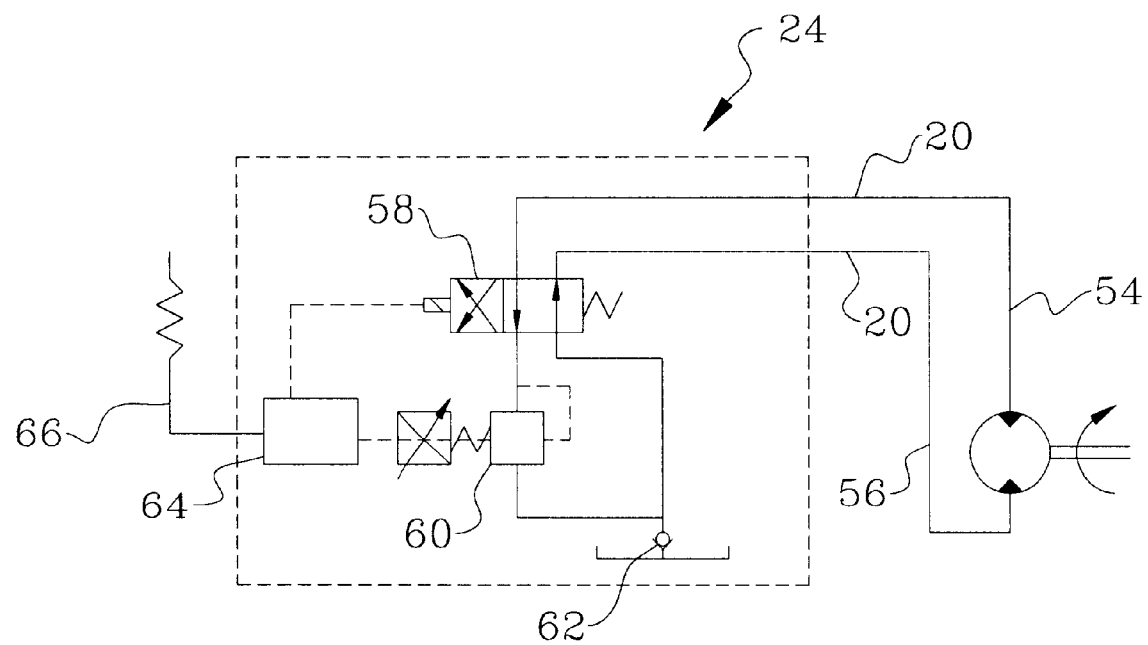
FIG. 4 is a schematic of the valves of the device of FIG. 1.

As shown in FIG. 4, the valve system 24 of the first preferred embodiment includes a directional control valve 58, a pressure relief valve 60, and a check valve 62, each preferably coupled to the hydraulic conduit 20. While rotating in one direction, the first rotary pump 22 outputs hydraulic fluid through the first portion 54 of the hydraulic conduit 20. While rotating in the other direction, the first rotary pump 22 outputs hydraulic fluid to the second portion 56 of the hydraulic conduit 20. The directional control valve 58 preferably functions to selectively direct the hydraulic fluid from either the first portion 54 or the second portion 56 of the hydraulic conduit 20 to the pressure relief valve 60. The pressure relief valve 60 preferably functions to control the maximum pressure of the hydraulic fluid in the hydraulic conduit 20. The check valve 62 preferably functions to allow one-way passage of the hydraulic fluid. The directional control valve 58, the pressure relief valve 60, and the check valve 62 preferably cooperate to selectively restrict the transmittal of hydraulic fluid through the hydraulic conduit 20. The valve system 24, of course, may include other suitable elements that, either in combination with the above elements or as substitution of the above elements, function to selectively restrict the transmittal of hydraulic fluid through the hydraulic conduit 20 and to control the maximum pressure of the hydraulic fluid in the hydraulic conduit 20. The valve system 24, including the directional control valve 58, the pressure relief valve 60, and the check valve 62, is preferably made with conventional materials and from conventional methods, but may alternatively be made with other suitable materials and from other suitable methods.

As shown in FIGS. 1 and 4, the limited slip differential device 10 of the first preferred embodiment also includes an electric control unit 64 coupled to the valve system 24. The electric control unit 64 preferably functions to control the directional control valve 58 and the pressure relief valve 60 of the valve system 24. The electric control unit 64 preferably controls the directional control valve 58 to direct the output hydraulic fluid of first rotary pump 22 to the pressure relief valve 60 (regardless of the direction of the first rotary pump 22), and preferably controls the pressure relief valve 60 to control the maximum pressure of the hydraulic fluid in the hydraulic conduit 20. In this manner, the electric control unit 64 preferably controls the valve system 24 to restrict the transmittal of hydraulic fluid through the hydraulic conduit 20. The electric control unit 64 preferably controls the valve system 24 upon the receipt of a slip detection signal 66 from a slip detection device (not shown). The slip detection device preferably functions to detect any slip of the wheels of the vehicle and, upon such detection, to send the slip detection signal 66 to the electric control unit 64. The electric control unit 64, however, may control the valve system 24 upon the receipt of other suitable signals from other suitable devices, or upon the detection of other suitable situations. The electric control unit 64 is preferably made with conventional materials and from conventional methods, but may alternatively be made with other suitable materials and from other suitable methods.

As shown in FIG. 1, the limited slip differential device 10 of the first preferred embodiment also includes a hydraulic unit 68, which functions to receive the directional control valve 58, the pressure relief valve 60, and the check valve 62 of the valve system 24. The hydraulic unit 68 is preferably coupled to an exterior surface 70 of the differential case 12. In this manner, the hydraulic unit 68 may be disconnected and replaced without disassembling the differential case 12. In other embodiments, one or more of the valves may be located within the bounds of the differential case 12 or in other remote locations. The hydraulic unit 68 is preferably made with conventional materials and from conventional methods, but may alternatively be made with other suitable materials and from other suitable methods.

Figure 5:
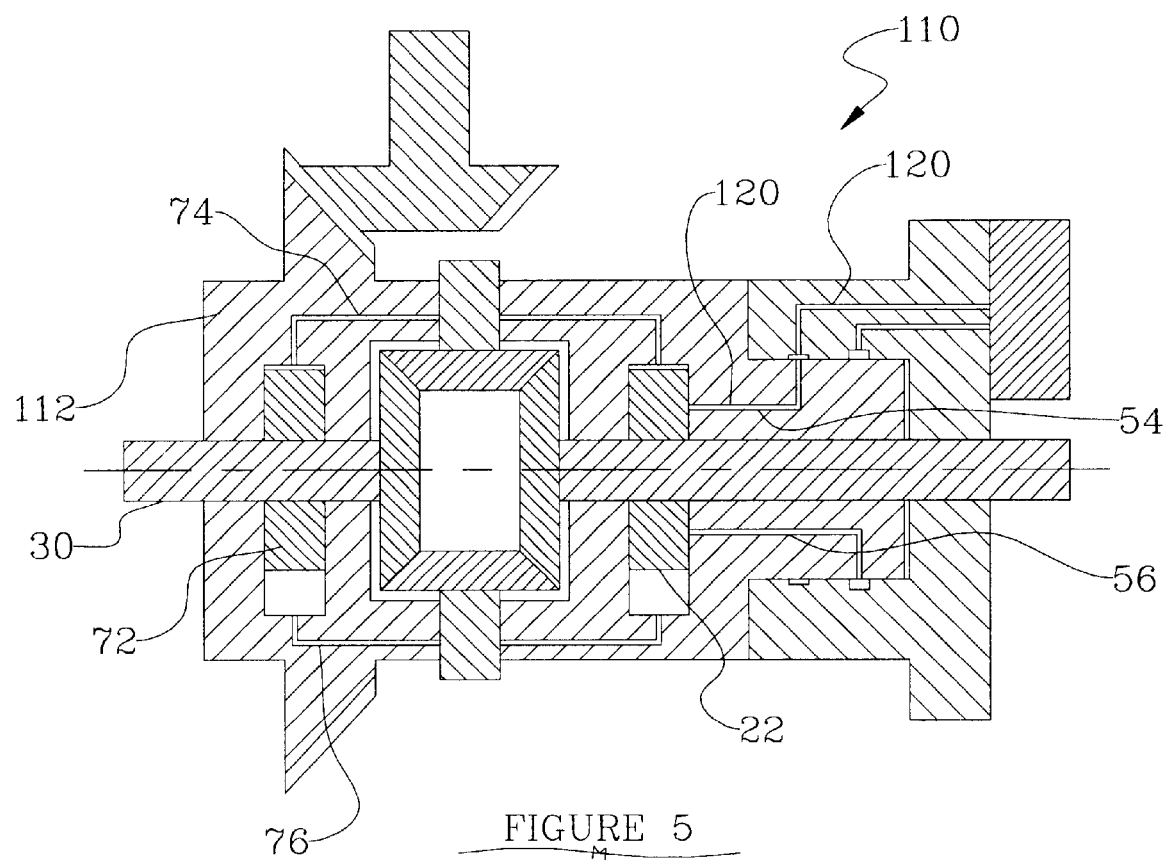
FIG. 5 is a cross-sectional view of the device of the second preferred embodiment.

As shown in FIG. 5, the differential device 110 of the second preferred embodiment includes a second rotary pump 72 coupled to a modified differential case 112 and the second output shaft 30. The second rotary pump 72, which is preferably structurally identical to the first rotary pump 22, preferably functions to pump hydraulic fluid through a modified hydraulic conduit 120 upon relative rotational movement of the modified differential case 112 and the second output shaft 30 and to resist relative rotational movement of the modified differential case 112 and the second output shaft 30 upon a restriction of the transmittal of hydraulic fluid through the modified hydraulic conduit 120. The modified hydraulic conduit 120 preferably includes a third portion 74 and a fourth portion 76, which preferably function to transmit hydraulic fluid between the first rotary pump 22 and the second rotary pump 72. The third portion 74 and the fourth portion 76 of the modified hydraulic conduit 120 are preferably fluidly connected to the first portion 54 and the second portion 56 of the modified hydraulic conduit 120. In the second preferred embodiment, the modified differential case 112 defines the third portion 74 and the fourth portion 76 of the modified hydraulic conduit 120. In alternative embodiments, other suitable devices may define the third portion 74 and the fourth portion 76 of the modified hydraulic conduit 120. Like the first rotary pump 22, the second rotary pump 72 is preferably a gerotor pump, but may alternatively be another suitable device. The second rotary pump 72 is preferably made with conventional materials and from conventional methods, but may alternatively be made with other suitable materials and from other suitable methods. The other elements of the second preferred embodiment are preferably identical to the elements of the first preferred embodiment.

During the preferred operation of the limited slip differential device 10 of the first preferred embodiment, an engine, or other device, rotates the input shaft 26. The ring gear 43 of the limited slip differential device 10 transfers the rotational movement of the input shaft 26 into a rotational movement of the differential case 12. If the first output shaft 28, which is connected to a wheel of the vehicle, rotates with the same rotational speed of the differential case. 12, the first rotary pump 22 does not pump the hydraulic fluid into the hydraulic conduit 20. If, however, the first output shaft 28 does not rotate with the same rotational speed of the differential case 12 (i.e., there is relative rotational movement of the differential case 12 and the first output shaft 28), the first rotary pump 22 pumps hydraulic fluid through the hydraulic conduit 20. The pressure in the hydraulic conduit 20 is proportional to the torque acted on the first output shaft 28, but the maximum pressure is restricted by the pressure relief valve 60.

At some point, the pressure in the hydraulic conduit 20 will be sufficient to resist further pumping by the first rotary pump 22. At this point, the first rotary pump 22 will resist further relative rotational movement of the differential case 12 and the first output shaft 28. The electric control unit 64, however, may selectively control the valve system 24 to release hydraulic fluid from the hydraulic conduit 20 and to thereby reduce pressure in the hydraulic conduit 20, or the electric control unit 64 may selectively control the valve system 24 to restrict the transmittal of hydraulic fluid through the hydraulic conduit 20, thereby selectively causing the first rotary pump to resist relative rotational movement of the differential case and the first output shaft. In this manner, the limited slip differential device 10 may selectively act as a limited slip differential device 78.

As any person skilled in the art of automotive differential devices will recognize from the previous description and from the figures and claims, modifications and changes can be made to the preferred embodiments of the invention without departing from the scope of the invention defined in the following claims.

I claim:

1. A differential device for coupling an input shaft, a first output shaft, and a second output shaft, comprising:
   a differential case coupled to the input shaft;
   a first side gear located within said differential case and coupled to the first output shaft;
   a second side gear located within said differential case and coupled to the second output shaft;
   a pinion gear located within said differential case, coupled to said first side gear and said second side gear, and adapted to transfer relative rotational movement of said differential case and one of the first and second output shafts into relative rotational movement of said differential case and the other of the first and second output shafts;
   a hydraulic conduit coupled to said differential case and adapted to transmit a hydraulic fluid;
   a first rotary pump coupled to said differential case and the first output shaft hydraulic fluid through said hydraulic conduit upon the relative rotational movement of said differential case and the first output shaft and to resist relative rotational movement of said differential case and the first output shaft upon a restriction of the transmittal of hydraulic fluid through said hydraulic conduit;
   a valve system coupled to said hydraulic conduit and adapted to selectively restrict the transmittal of hydraulic fluid through said hydraulic conduit, thereby selectively causing said first rotary pump to resist relative rotational movement of said differential case and the first output shaft, wherein said valve system includes a pressure relief valve coupled to said hydraulic conduit and adapted to selectively control the maximum pressure of the hydraulic fluid in said hydraulic conduit; and
   a directional control valve coupled to said hydraulic conduit and adapted to selectively direct hydraulic fluid to said pressure relief valve.

2. The device of claim 1 wherein said differential case defines said hydraulic conduit.

3. The device of claim 1 wherein said first rotary pump includes a gerotor device.

4. The device of claim 1 further comprising a hydraulic unit coupled to said differential case and adapted to receive said directional control valve and said pressure relief valve.

5. The device of claim 1 further comprising an electric control unit coupled to said valve system and adapted to control said valve system.

6. The device of claim 5 wherein said electric control unit is further adapted to control said valve system upon the receipt of a slip detection signal.

7. A differential device for coupling an input shaft, a first output shaft, and a second output shaft, comprising:
   a differential case coupled to the input shaft;
   a first side gear located within said differential case and coupled to the first output shaft;
   a second side gear located within said differential case and coupled to the second output shaft;
   a pinion gear located within said differential case, coupled to said first side gear and said second side gear, and adapted to transfer relative rotational movement of said differential case and one of the first and second output shafts into relative rotational movement of said differential case and the other of the first and second output shafts;
   a hydraulic conduit coupled to said differential case and adapted to transmit a hydraulic fluid;
   a first rotary pump coupled to said differential case and the first output shaft and adapted to pump hydraulic fluid through said hydraulic conduit upon the relative rotational movement of said differential case and the first output shaft and to resist relative rotational movement of said differential case and the first output shaft upon a restriction of the transmittal of hydraulic fluid through said hydraulic conduit;
   a valve system coupled to said hydraulic conduit and adapted to selectively restrict the transmittal of hydraulic fluid through said hydraulic conduit, thereby selectively causing said first rotary pump to resist relative rotational movement of said differential case and the first output shaft; and
   a second rotary pump coupled to said differential case and the second output shaft and adapted to pump hydraulic fluid through said hydraulic conduit upon the relative rotational movement of said differential case and the second output shaft and to resist relative rotational movement of said differential case and the second output shaft upon a restriction of the transmittal of hydraulic fluid through said hydraulic conduit.

8. The device of claim 7 wherein said first rotary pump and said second rotary pump both include a gerotor device.

9. A method of coupling a differential device to an input shaft, a first output shaft, and a second output shaft, comprising:

providing a differential case and coupling the differential case to the input shaft;

providing a first side gear within the differential case and coupling the first side gear to the first output shaft;

providing a second side gear within the differential case and coupling the second side gear to the second output shaft;

providing a pinion gear located the differential case, coupling the pinion gear to the first side gear and the second side gear, and adapting the pinion gear to transfer relative rotational movement of the differential case and one of the first and second output shafts into relative rotational movement of the differential case and the other of the first and second output shafts;

providing a hydraulic conduit, coupling the hydraulic to the differential case, and adapting the hydraulic conduit to transmit a hydraulic fluid;

providing a first rotary pump, coupling the first rotary pump to the differential case and the first output shaft, and adapting the first rotary pump to pump hydraulic fluid through the hydraulic conduit upon the relative rotational movement of the differential case and the first output shaft and to resist relative rotational movement of the differential case and the first output shaft upon a restriction of the transmittal of hydraulic fluid through the hydraulic conduit; and providing a valve system, coupling the valve system to the hydraulic conduit, and adapting the valve system to selectively restrict the transmittal of hydraulic fluid through the hydraulic conduit, thereby selectively causing the first rotary pump to resist relative rotational movement of the differential case and the first output shaft;

providing a pressure relief valve, coupling the pressure relief valve to the hydraulic conduit, and adapting the pressure relief valve to selectively control the maximum pressure of the hydraulic fluid in the hydraulic conduit; and providing a directional control valve, coupling the directional control valve to the hydraulic conduit, and adapting the directional control valve to selectively direct hydraulic fluid to the pressure relief valve.

10. The method of claim 9 further comprising providing a hydraulic unit, coupling the hydraulic unit to the differential case, and adapting the hydraulic unit to receive the directional control valve and the pressure relief valve.

11. The method of claim 9 further comprising providing an electric control unit, coupling the electric control unit to the valve system, and adapting the electric control unit to control the valve system.

12. The method of claim 11 further comprising adapting the electric control unit to control the valve system upon the receipt of a slip detection signal.

13. A method of coupling a differential device to an input shaft, a first output shaft, and a second output shaft, comprising:

providing a differential case and coupling the differential case to the input shaft;

providing a first side gear within the differential case and coupling the first side gear to the first output shaft;

providing a second side gear within the differential case and coupling the second side gear to the second output shaft;

providing a pinion gear located the differential case, coupling the pinion gear to the first side gear and the second side gear, and adapting the pinion gear to transfer relative rotational movement of the differential case and one of the first and second output shafts into relative rotational movement of the differential case and the other of the first and second output shafts;

providing a hydraulic conduit, coupling the hydraulic to the differential case, and adapting the hydraulic conduit to transmit a hydraulic fluid;

providing a first rotary pump, coupling the first rotary pump to the differential case and the first output shaft, and adapting the first rotary pump to pump hydraulic fluid through the hydraulic conduit upon the relative rotational movement of the differential case and the first output shaft and to resist relative rotational movement of the differential case and the first output shaft upon a restriction of the transmittal of hydraulic fluid through the hydraulic conduit; and providing a valve system, coupling the valve system to the hydraulic conduit, and adapting the valve system to selectively restrict the transmittal of hydraulic fluid through the hydraulic conduit, thereby selectively causing the first rotary pump to resist relative rotational movement of the differential case and the first output shaft; and providing a second rotary pump, coupling the second rotary pump to the differential case and the second output shaft, and adapting the second rotary pump to pump hydraulic fluid through the hydraulic conduit upon the relative rotational movement of the differential case and the second output shaft and to resist relative rotational movement of the differential case and the second output shaft upon a restriction of the transmittal of hydraulic fluid through the hydraulic conduit.

* * * * *

UNITED STATES PATENT AND TRADEMARK OFFICE
CERTIFICATE OF CORRECTION

PATENT NO.     : 6,544,137 B2
DATED          : April 8, 2003
INVENTOR(S)    : Xiaohong Nina Duan It is certified that error appears in the above-identified patent and that said Letters Patent is hereby corrected as shown below:

<u>Title page,</u>
Item [56], U.S. PATENT DOCUMENTS, delete "RE33,742 E" and substitute
-- RE33,742 A -- in its place.

<u>Column 5,</u>
Line 59, after "output shaft" insert -- and adapted to pump --.

Signed and Sealed this

Second Day of September, 2003

JAMES E. ROGAN
*Director of the United States Patent and Trademark Office*